United States Patent
Andre et al.

(10) Patent No.: US 7,552,106 B2
(45) Date of Patent: Jun. 23, 2009

(54) VARIABLE LENGTH FILE ENTRY NAVIGATION

(75) Inventors: Herve Philippe Andre, Tucson, AZ (US); Roger Gregory Hathorn, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 10/991,445

(22) Filed: Nov. 17, 2004

(65) Prior Publication Data

US 2006/0106751 A1    May 18, 2006

(51) Int. Cl.
*G06F 7/00* (2006.01)
*G06F 17/30* (2006.01)

(52) U.S. Cl. .............................. 707/1; 707/102; 711/172
(58) Field of Classification Search ............... 707/1–10, 707/100–104.1, 200–206; 711/170–173; 369/53.1; 711/72.1
See application file for complete search history.

(56) References Cited

U.S. PATENT DOCUMENTS

| | | | |
|---|---|---|---|
| 4,775,969 A * | 10/1988 | Osterlund | 369/53.1 |
| 5,170,479 A | 12/1992 | Takmoro | |
| 5,561,795 A | 10/1996 | Sarkar | |
| 5,710,676 A * | 1/1998 | Fry et al. | 360/72.1 |
| 6,643,653 B1 * | 11/2003 | Chu | 707/10 |
| 2002/0059234 A1 * | 5/2002 | Gumpertz et al. | 707/7 |
| 2002/0059260 A1 * | 5/2002 | Jas | 707/100 |
| 2002/0065823 A1 * | 5/2002 | Boulter et al. | 707/7 |

OTHER PUBLICATIONS

Aiken et al, Microsoft Press, Microsoft Computer Dictionary, p. 97 (2002).*
van Wijngaarden et al., Partial-prefix synchronizable codes, Jul. 2001, IEEE, vol. 47, 1839-1848.*
Yi-Yu Liu et al., Binary decision diagram with minimum expected path length, Mar. 13-16, 2001, IEEE, 708-712.*

* cited by examiner

*Primary Examiner*—Jean B Fleurantin
(74) *Attorney, Agent, or Firm*—William K. Konrad; Konrad Raynes & Victor LLP (57) ABSTRACT

Provided are a method, system, deployment and article of manufacture, for variable length file entry navigation. In one embodiment, a first file entry size portion of a first entry marker at a first end of a file entry is read. A position of a second entry marker at a second end of the file entry may be calculated as a function of the first file entry size portion. A determination may be made as to whether file data at the calculated position is a second entry marker, and if so whether the file data between said first and second entry markers is a valid entry by comparing the first entry size portion of the first entry marker to a second file entry size portion of the second entry marker. Other embodiments are described and claimed.

14 Claims, 4 Drawing Sheets

VARIABLE LENGTH FILE ENTRY NAVIGATION

BACKGROUND

1. Field

The present invention relates to a method, system, deployment and an article of manufacture for variable length file entry navigation.

2. Description of the Related Art

A collection of data or information may be given a name in a computer system and stored as a file in the computer system. There are many different types of files for storing various types of data. For example, numerical or text data may be stored in data files, programs in program files, directories in directory files, and so on.

The data stored in a file may be subdivided into entries. In some files, the entries may have a fixed length. In other files, the length of each entry may vary, depending upon the size of the data to be stored at that entry.

Various techniques have been utilized to locate a particular entry in a file. Some files may have external data in the form of a table, index or directory, for example, which lists the location of each entry of the file. In addition, the external data may also indicate the size as well as location of each entry.

Other files may have internal data in the form of a delimiter or marker between each entry to mark the beginning or end of an adjacent entry. One type of marker comprises a unique string of characters. The string of characters may be chosen in a manner which facilitates distinguishing a marker from the data of each entry. In such a file, the entries may be located by traversing the file, starting at the beginning of the file, and examining each byte of data of the file to find the entry markers. In this manner, the beginning and end of each file entry may be calculated.

In another approach, each marker may include size information which indicates the size of the associated entry marked by the marker. Placed at the beginning of an entry, the size information of the marker may be read and used to jump from one entry to the next. If placed at the end of each entry, the size information of the marker may be read and used to jump from one entry to the next in the other direction. Still another approach is to include in each marker, the address of the next marker. Again, placed at the beginning of an entry, the next-marker address information of the marker may be read and used to jump from one entry to the next.

A computer system may have one or more embedded devices, each of which may itself be a specialized computer system that is part of a larger system such as a host computer system. For example, a storage controller may be embedded in a host computer. The embedded storage controller may be housed on a single microprocessor board with the programs stored in ROM or other types of memory. Some embedded systems include an operating system. Other embedded systems may be so specialized that the entire logic can be implemented as a single program.

Embedded systems, like computer systems in general, often generate log information to record various events such as error conditions. Such log information is typically stored in a file to preserve the recorded events. However, storage space is often at a premium, particularly in embedded systems.

SUMMARY OF THE DESCRIBED EMBODIMENTS

Provided are a method, system, deployment and article of manufacture, for variable length file entry navigation. In one embodiment, a first file entry size portion of a first entry marker at a first end of a file entry is read. A position of a second entry marker at a second end of the file entry may be calculated as a function of the first file entry size portion. A determination may be made as to whether file data at the calculated position is a second entry marker, and if so whether the file data between said first and second entry markers is a valid entry by comparing the first entry size portion of the first entry marker to a second file entry size portion of the second entry marker. Other embodiments are described and claimed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the present embodiments.

Figure 1:
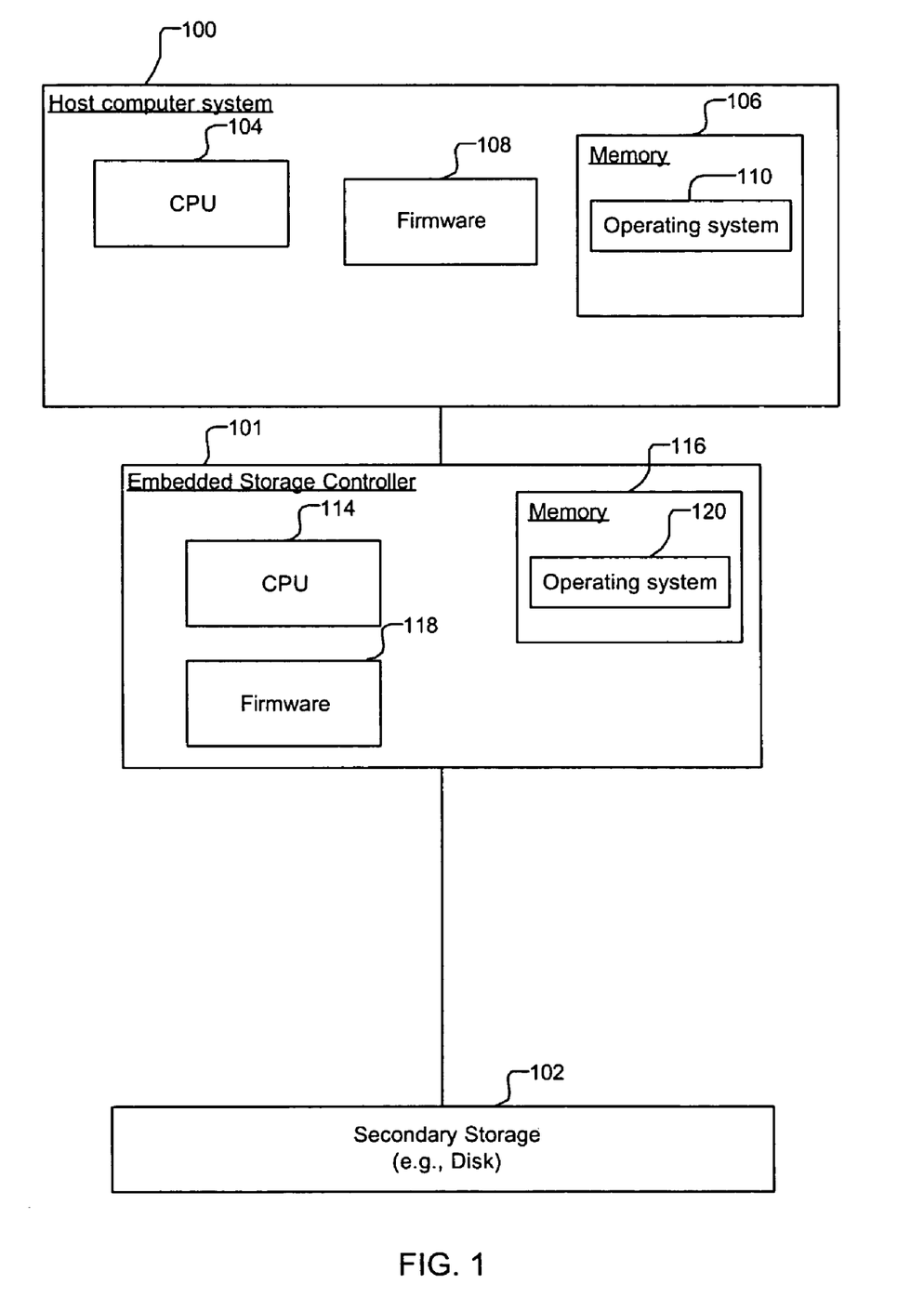
FIG. 1 illustrates a block diagram of a computing environment, in accordance with certain described embodiments.

FIG. 1 illustrates a block diagram of a computing environment, in accordance with certain embodiments of the description provided herein. A computational device which is a host computer system 100 in this embodiment, is shown to have an embedded computer system which, in this embodiment is a storage controller 101 coupled to a secondary storage 102. Although the secondary storage 102 is shown external to the host computer system 100 and the embedded storage controller 101, in certain embodiments the secondary storage 102 may be internal to the host computer system 100 or the storage controller 101. In additional embodiments, additional host computer systems (not shown), such as a host system that performs Input/Output (I/O) operations with respect to the host computer system 100, may be utilized.

The host computer system 100 may include a personal computer, a workstation, a server, a mainframe, a hand held computer, a palm top computer, a telephony device, a network appliance, a blade computer, a storage controller, etc. Similarly, the embedded computer system 101 may include a personal computer, a workstation, a server, a mainframe, a hand held computer, a palm top computer, a telephony device, a network appliance, a blade computer, a storage controller, etc. The secondary storage 102 may include a direct access storage device, such as, a disk, a tape, a Read/Write DVD, a Read/Write CDROM, a Redundant Array of Independent Disks (RAID), Just a Bunch of Disks (JBOD), etc., or any other storage device. Each of the secondary storage 102, the host computer system 100 and the embedded computer system 101 may be coupled to one or more of the others by a network (not shown), such as the Internet, an intranet, a Local area network (LAN), a Storage area network (SAN), a Wide area network (WAN), a wireless network, etc. Each of the secondary storage 102, the host computer system 100 and the embedded computer system 101 may alternatively be coupled to one or more of the others without a network, such as through direct lines, common bus systems, etc.

The host computer system 100 may include a central processing unit (CPU) 104, a memory 106, a firmware 108, and an operating system 110. Similarly, the embedded computer system 101 may include a CPU 114, a memory 116, a firmware 118, and an operating system 120.

Each CPU 104, 114 may comprise a complex instruction set computing (CISC) processor, or a reduced instruction set computing (RISC) processor, for example. It is appreciated that other types of processors may be utilized, depending upon the particular application. While only a single CPU 104, 114 is shown for the associated system 100, 101, in certain embodiments the host computer system 100 or the embedded computer system 101 may each include additional CPUs to form a multiprocessing system.

Each memory 106, 116 may comprise a random access memory (RAM). Each memory 106, 116 may also be referred to as physical memory. In certain embodiments, the memory 106, 116 may be included in chips coupled to a bus in the associated computer system 100, 101. Each memory 106, 116 may be volatile, which means that the memory may require a steady flow of electricity to maintain the contents of the memory 106, 116. Alternatively, each memory 106, 116 may include nonvolatile memory.

Each firmware 108, 118 may include programs or data that may have been written onto read-only memory (ROM), programmable read only memory (PROM), erasable programmable read-only memory (EPROM), etc. Each firmware 108, 118 may be a combination of hardware and software.

Each operating system 110, 120 may be software that controls the execution of system and application programs that execute in the associated computer system 100, 101. Each operating system 110, 120 may provide various services to the system and application programs that execute in the associated computer system 100, 101. In certain embodiments, each operating system 110, 120 may include the LINUX operating system, the UNIX operating system, or the AIX operating system, for example. It is appreciated that another type of operating system may be utilized, depending upon the particular application.

As previously mentioned, in the illustrated embodiment, the embedded computer system 101 is an embedded storage controller. It is appreciated that the embedded computer system 101 may be other types of devices as set forth above. In other embodiments, the computer system 100 may lack an embedded system such as the system 101.

Figure 2:
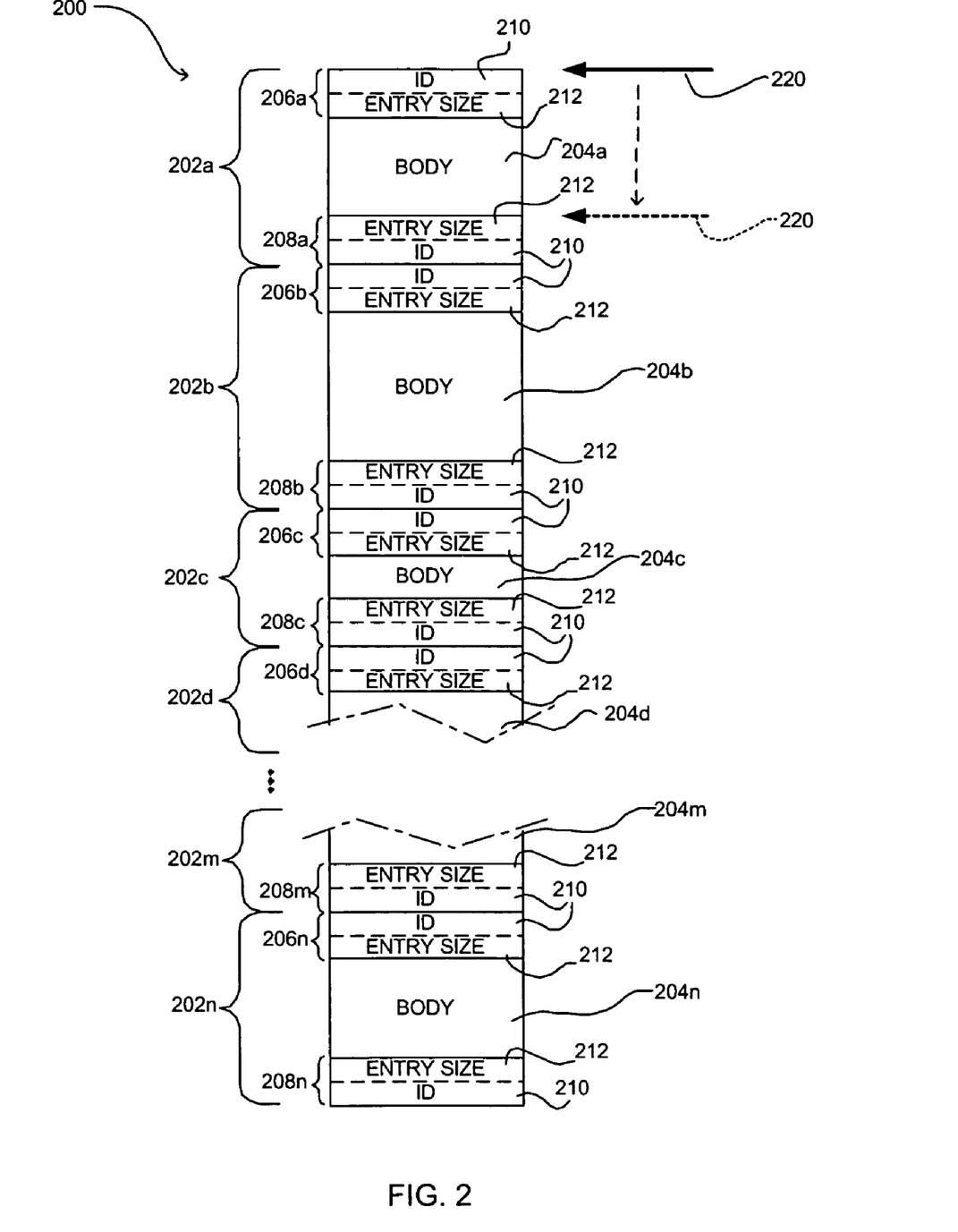
FIG. 2 illustrates one embodiment of a file structure which facilitates variable length file entry navigation.

The computer system 101 stores log information in a file 200, an example of which is shown in FIG. 2. In this example, the file 200 has a plurality of entries 202a, 202b . . . 202n, where n may be any positive integer number and represents a number which may vary, depending upon the particular application. For example, the total number of file entries 202a, 202b . . . 202n, may vary, depending upon the particular application.

As explained in greater detail below, in one aspect of the description provided herein, the file 200 has an internal structure which facilitates validation of entries while traversing the file in either direction, beginning to end, or end to beginning, to locate a particular entry. Thus, should it be determined that an entry has become corrupted which may inhibit file traversal in one direction, an entry 202a, 202b . . . 202n may be located by traversing the file 200 in the other direction. In addition, an internal segment of valid entries bordered by corrupted entries may be traversed and recovered as well. It is appreciated that this or other aspects may be utilized, depending upon the particular application.

In the example of the illustrated embodiment, each file entry includes a body 204a, 204b . . . 204n. Each body 204a, 204b . . . 204n contains data such as log data for example. It is appreciated that the type of data stored in each body 204a, 204b . . . 204n of the associated file entry 202a, 202b . . . 202n may vary, depending upon the particular application. For example, each body 204a, 204b . . . 204n may contain text data, numerical data, programs, firmware etc.

In the illustrated embodiment, the size or length of each entry data body 204a, 204b . . . 204n varies from entry to entry. One end of each entry 202a, 202b, . . . 202c is marked with a first or beginning marker 206a, 206b . . . 206n. Similarly, the other end of each entry 202a, 202b, 202c is marked with a second or end marker 208a, 208b . . . 208n. In the illustrated embodiment, each entry marker 206a, 206b . . . 206n, 208a, 208b . . . 208n, includes an identification or tag portion 210 and an entry size portion 212. In this embodiment, the identification portion 210 of each marker 206a, 206b . . . 206n, 208a, 208b . . . 208n is separate. It is appreciated however, that in alternative embodiments, adjacent entry markers such as entry markers 208a, 206b, for example, may share a common identification or tag portion 210.

In this example, the identification portion 210 of each marker 206a, 206b . . . 206n, 208a, 208b . . . 208n, is a fixed length numerical or character string which is selected to reduce the chance that a data portion of a body 204a, 204b . . . 204n could be confused with an identification portion 210 of an entry marker 206a, 206b . . . 206n, 208a, 208b . . . 208n. For example, the hexadecimal pattern "0xFFFABCDDCBAFFFF" may be selected. It is appreciated that other data such as graphical data may be used for the identification portion 210, depending upon the particular application. In addition, the identification portion 210 of each marker 206a, 206b . . . 206n, 208a, 208b . . . 208n does not vary. Thus, the identification portion 210 of each marker 206a, 206b . . . 206n, 208a, 208b . . . 208n is identical to the identification portion 210 of each other marker 206a, 206b . . . 206n, 208a, 208b . . . 208n. It is appreciated that in other embodiments, the length of the string and the numbers or characters selected for the string may vary from one marker to another within a file 200, depending upon the particular application.

In the illustrated embodiment, the entry size portion 212 of each marker 206a, 206b . . . 206n, 208a, 208b . . . 208n, is a variable containing data representing the size of the associated body 204a, 204b . . . 204n and the size of a marker 206a, 206b . . . 206n, 208a, 208b . . . 208n, of the entry. Also, the entry size portion 212 of each marker 206a, 206b . . . 206n, 208a, 208b . . . 208n, is a variable of fixed length such that each marker 206a, 206b . . . 206n, 208a, 208b . . . 208n, is also of fixed length. It is appreciated that in other embodiments, the length of each entry size portion 212 and each entry marker 206a, 206b . . . 206n, 208a, 208b . . . 208n may vary from one marker to another within a file 200, depending upon the particular application.

As explained in greater detail below, the entry size data stored in the entry size portion 212 of each first or beginning marker 206a, 206b . . . 206n, may be utilized to increment the value of a location pointer 220, to jump to the next entry 202a, 202b . . . 202n of the file 200 in traversing the file 200 in one direction. In addition, the identification portion 210 of each second entry marker 208a, 208b . . . 208n may be utilized to verify that the pointer 220 has been incremented to point to a valid second or end marker 208a, 208b . . . 208n. Still further, the entry size data stored in the entry size portion 212 of each second marker 208a, 208b . . . 208n may be utilized to verify that the marker is the expected marker at the other end of the file entry 202a, 202b . . . 202n. In a similar fashion, the identification portions 210 and entry size portions 212 of the entry markers 206a, 206b . . . 206n, 208a, 208b . . . 208n may be utilized to traverse the file 200 in the other direction, validating each entry in turn.

Figure 3:
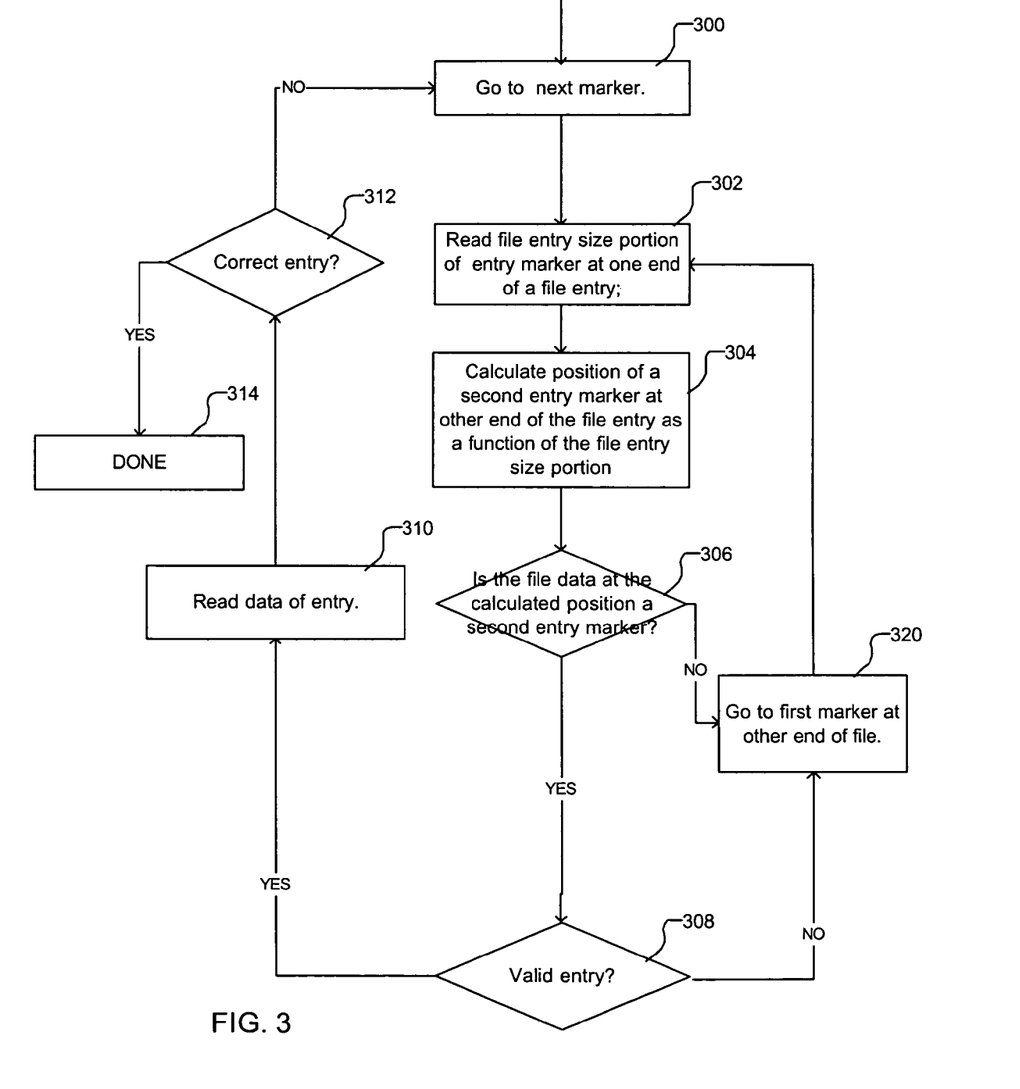
FIG. 3 illustrates one embodiment of logic for variable length file entry navigation.

FIG. 3 illustrates one example of operations of a computer system such as the embedded storage controller 101, to traverse a file such as the file 200 of FIG. 2. In one operation, the controller 101 goes (block 300) to a marker, such as the marker 206a, for example, which is at one end of a file entry, such as the file entry 202a, for example, and reads (block 302) the file entry size portion 210 of that marker 206a. The marker 206a may be recognized as a marker by reading bytes of the file 200 and recognizing the identification portion 210 of the marker 206a.

In another operation, the position of a second or end marker, such as the second entry marker 208a, for example, may be calculated (block 304) as a function of the file entry size portion. A determination (block 306) may be made as to whether the file data at the calculated position is a second entry marker. In the illustrated embodiment, a pointer such as the pointer 220 (FIG. 2) may be used to point to an address of the first marker 206a at one end of the entry 202a. The pointer 220 may be changed to point to a downstream portion of the file 200 by incrementing the pointer 220.

Thus, if for example, the pointer 220 were pointing to the first byte of the first marker 206a, the pointer 220 if incremented by the number of bytes of the first marker 206a, may be changed to point to the first byte of the body 204a of the entry 202a. If, for example, the pointer 220 were incremented again but by the number of bytes of the body 204a, the pointer 220 may be changed to point to the first byte of the second marker 208a. In this manner, the controller 101, in traversing the file 200 can skip from the first marker 206a at one end of the file entry 202a, to the second marker 208a at the other end of the file entry 202a. Thus, in this example, the file entry size portion 212 of the first marker 206a can contain a value representing the total number of bytes of the first maker 206a and the body 204a of the file entry 202a. This value may be added to the address of the pointer 220 to skip over the first marker 206a and the body 204a to the second marker 208a of the file entry 202a.

It is appreciated that the value contained within the file entry size portion 212 of each file entry may vary not just on the size of the body 204a, 204b . . . 204n of each entry, but also on the location of the pointer 220 within the file entry when the position of the second marker 208a, 208b . . . 208n is calculated. For example, if the pointer 220 points to the first byte of the body 204a, 204b . . . 204n, the value stored in the file entry size portion 212 may simply be a value representing the size of the body 212 since the first marker 206a, 206b . . . 206n will have already been skipped over. In yet another example, the value stored in the in the file entry size portion 212 may be a value representing the size of the body 212 and a portion of the first marker 206a, 206b . . . 206n if the pointer is addressing an interior location of the first marker 206a, 206b . . . 206n at the time the calculation of the expected position of the second marker is made.

In one embodiment, to determine (block 306) whether the file data encountered at the calculated position is a second entry marker 208a, 208b . . . 208n, a portion of the bytes at the calculated location may be examined to determine whether those bytes match the expected identification string at the expected location of the identification portion 210 of the second marker 208a.

If it is determined (block 306) that the file data at the calculated position is a second entry marker, a determination (block 308) may be made as to whether the entry is a valid entry. In the illustrated embodiment, the file entry may be deemed to be a valid entry if the entry size portion 212 of the marker encountered at the calculated position matches the entry size portion 212 of the first marker 206a at the other end of the file entry 202a. If so, the marker encountered at the calculated position may be deemed to be the expected second marker 208a and the file entry may be deemed to be valid. It is appreciated that other functions may be used to compare the entry size portion 212 of the marker encountered at the calculated position to the entry size portion 212 of the first marker 206a at the other end of the file entry 202a.

In the illustrated embodiment, the positions of the identification portion 210 and the entry size portion 212 of each first or beginning marker 206a, 206b . . . 206n, are reversed as compared to the positions of the identification portion 210 and the entry size portion 212 of each second or end marker 208a, 208b . . . 208n. It is appreciated that in other embodiments, the positions may be the same for all markers, or may vary from marker to marker, depending upon the particular application.

If deemed a valid entry, data of the entry, such as a portion of the body 204a, may be read (block 310) and a determination may be made (block 312) as to whether the entry 202a is the entry being sought. If so, the traversal may be completed (block 314). If it is determined that the entry 202a is not the entry being sought, the controller 101 may traverse to the next entry (block 300) such as entry 202b, for example, and read the first entry marker 206b of that entry. The controller may continue traversing the file 200 in this manner, skipping from the first marker 206a, 206b . . . 206n to the second marker 208a, 208b . . . 208n at the other end of each entry 202a, 202b . . . 202n until the sought after entry is located.

If during this traversal, it is determined (block 306) that the file data at the calculated position is not a second marker 208a, 208b . . . 208n as expected, a corruption of the file 200 may have occurred at that file entry. Hence, the controller 101 can go (block 320) to a marker at the other end of the file 200 and traverse the file 200 in the other direction, that is, in the upstream direction, from end to beginning of the file 200. In the illustrated example, the file entry at the end of the file 200 is the file entry 202n and the marker first encountered is the end marker 208n. Thus, in the illustrated embodiment, the controller 101 may read (block 302) the file entry size portion 210 of that end marker 208n. The end marker 208n may be recognized as a marker by reading bytes of the file 200 and recognizing the identification portion 210 of the marker 208n.

In another operation, the position of the marker expected to be at the other end of the entry 202n, that is, the beginning marker 206n, for example, may be calculated (block 304) as a function of the file entry size portion 212 of the end marker 202n as described above, and a determination (block 306) may be made as to whether the file data at the calculated position is the expected entry marker. In the illustrated embodiment, a pointer such as the pointer 220 pointing to an address of the marker 208n at the end of the entry 202n may be decremented to point to the expected location of the marker 206n at the beginning of the entry 202n. In this manner, the controller 101, in traversing the file 200 can skip from the end marker 208n at one end of the file entry 202a, to the beginning marker 206n at the other end of the file entry 202n, in the upstream direction.

Again, to determine (block 306) whether the file data encountered at the calculated position is an entry marker 206a, 206b . . . 206n as expected, a portion of the bytes at the calculated location may be examined to determine whether those bytes match the expected identification string at the expected location of the identification portion 210 of the marker 206n.

If it is determined (block 306) that the file data at the calculated position is an entry marker, a determination (block 308) may be made as to whether the entry is a valid entry. Again, the file entry may be deemed to be a valid entry if the entry size portion 212 of the marker encountered at the calculated position matches the entry size portion 212 of the marker 208n at the end of the file entry 202n. If so, the marker encountered at the calculated position may be deemed to be the expected second marker 208a and the file entry may be deemed to be valid.

If deemed a valid entry, data of the entry, such as a portion of the body 204n, may be read (block 310) and a determination may be made (block 312) as to whether the entry 202n is the entry being sought. If so, the traversal may be completed (block 314). If it is determined that the entry 202n is not the entry being sought, the controller 101 may traverse to the next entry (block 300) such as entry 202m, for example, and read the entry marker 208m of that entry. The controller may continue traversing the file 200 in this manner, skipping from the end marker 208n, 208 m . . . 208b, 208a to the beginning marker 206n, 206 m . . . 206b, 206a at the other end of each entry 202n, 202 m . . . 202b, 202a until the sought after entry is located.

If it is determined (block 308) that an entry is not a valid entry, corruption of the file 200 may have occurred at that entry. Hence, the controller 101 can go (block 320) to a marker at the other end of the file 200 and traverse the file 200 in the other direction as described above to attempt to locate the sought after entry. In the illustrated embodiment, the file entry may be deemed to be an invalid entry if the entry size portion 212 of the marker encountered at the calculated position does not match the entry size portion 212 of the marker at the other end of the file entry. Thus, it is appreciated that a valid marker might be encountered at the calculated position but that the encountered marker may be for a different entry. Hence, the entry between the markers at each end would be deemed to be an invalid entry and traversal of the may be undertaken in the other direction to locate the sought after entry.

It is appreciated that a corrupted entry 202a, 202b . . . 202n may be encountered while traversing the file 200 in both directions. Hence, there may be an interior string of valid entries bordered by corrupted entries at each end of the string of valid entries. To recover these valid interior entries, the controller 101 may search past the corrupted entry at one end for an identification portion 210 and obtain a first size parameter from the adjacent entry size portion 212. The controller 101 can continue to search for the next identification portion 210. This search may be accomplished by seeking ahead a number of bytes as indicated by the first size parameter or searching byte by byte through the file data, for example. Upon locating the next identification portion 210, the controller 101 may obtain a second size parameter from the adjacent entry size portion 212. If the first and second size parameters match, the entry may be deemed a valid entry and a determination may be made as to whether the valid entry is the entry being sought. If the valid entry is not the entry being sought, the controller may proceed to the next entry and verify whether it is a valid entry as set forth above.

If it is determined that the first and second size parameters do not match, the entry may be deemed to be an invalid entry. In which case, the value of the first size parameter may be replaced by the value of the second parameter to provide a new first size parameter. The controller 101 may continue by searching for the next identification portion 210. Upon locating the next identification portion 210, the controller 101 may obtain a new second size parameter from the adjacent entry size portion 212. If the new first and second size parameters match, the entry may be deemed a valid entry and a determination may be made as to whether the valid entry is the entry being sought. If the valid entry is not the entry being sought, the controller may proceed to the next entry and verify whether it is a valid entry as set forth above. If it is determined that the new first and second size parameters do not match, the entry may be deemed to be an invalid entry. In which case, the value of the new first size parameter may be replaced by the value of the new second parameter to provide yet another new first size parameter and the controller 101 may proceed as described above to locate a valid entry.

In the illustrated embodiment, a pair of adjacent identification portions 210 border adjacent file entries such as entries 202b, 202c, for example. It is appreciated that in other embodiments, a single identification portion 210 may be shared by adjacent entries to demarcate the separate entries.

It is appreciated that utilization of the entry size portions 212 in combination with one or more identification portions 212, provide a file traversal structure which is may be independent of the particular medium or physical addresses of the media in which the file 200 is stored. Thus, for example, the file 200 or a segment of the file 200 may be transferred from one memory location to another memory location within one storage type such as disk storage or to another completely different type of storage such as tape memory, for example.

Additional Implementation Details

The described techniques may be implemented as a method, apparatus, deployment or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the embodiments, and that the article of manufacture may comprise any information bearing medium known in the art.

Certain embodiments may be directed to a method for deploying computing instruction by a person or automated processing integrating computer-readable code into a computing system, wherein the code in combination with the computing system is enabled to perform the operations of the described embodiments.

Figure 4:
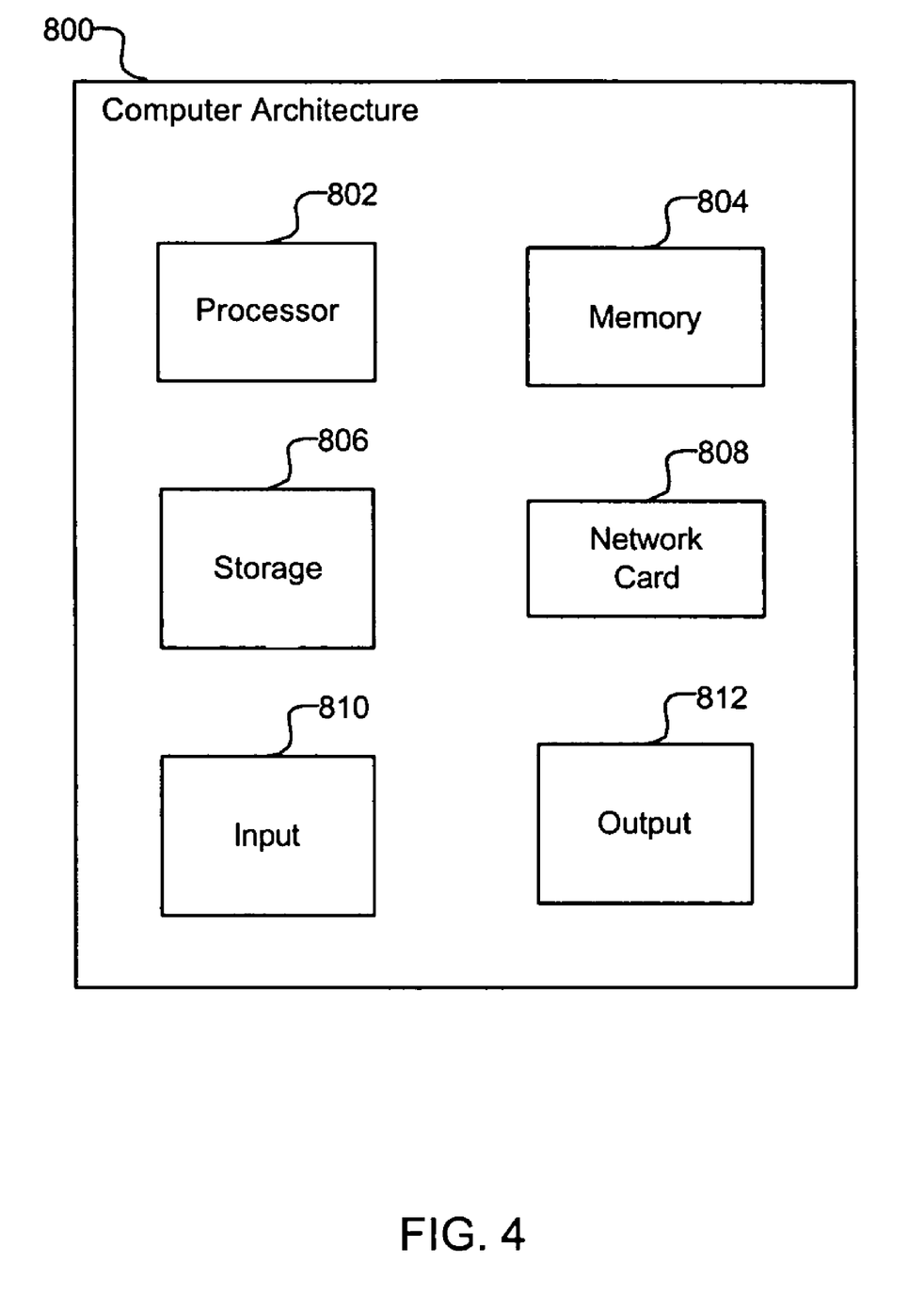
FIG. 4 illustrates a block diagram of a computer architecture in which certain described aspects may be implemented.

In the illustrated embodiment, the computer system 101 has been described as an embedded storage controller. It is appreciated that the system 101 may be other types of computer systems. FIG. 4 illustrates a block diagram of a computer architecture in which certain aspects of the description provided herein may be implemented. The computer system 101 may implement a computer architecture 800 having a processor 802 (e.g., CPU 104), a memory 804 (e.g., a volatile memory device, such as, memory 106), and storage 806 (e.g., a nonvolatile storage, magnetic disk drives, optical disk drives, tape drives, etc.). In certain embodiments the storage 806 may include the secondary storage 102. The storage 806 may comprise an internal storage device, an attached storage device or a network accessible storage device. Programs in the storage 806 may be loaded into the memory 804 and executed by the processor 802 in a manner known in the art. The architecture may further include a network card 808 to enable communication with a network. The architecture may also include at least one input port 810 for various devices such as a dongle, keyboard, a touchscreen, a pen, voice-activated input, etc. The architecture may include at least one output 812, such as a display device, an indicator, a speaker, a printer, etc.

The logic of FIG. 3 describes specific operations occurring in a particular order. Further, the operations may be performed in parallel as well as sequentially. In alternative embodiments, certain of the logic operations may be performed in a different order, modified or removed and still implement embodiments of the present invention. Moreover, steps may be added to the above described logic and still conform to the embodiments. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the embodiments has been presented for the purposes of illustration and description. It is not intended to be exhaustive or to limit to the precise form disclosed. Many modifications and variations are possible in light of the above teaching.

*AIX, Enterprise Storage Server (ESS) are trademarks of International Business Machines Corp.

*UNIX is a trademark of the Open Group.

What is claimed is:

1. A method of traversing a file stored on a computer readable storage medium, comprising:
    addressing a first entry marker at a first end of a file entry using a pointer which points to an address of file data containing at least a portion of a first marker;
    reading a first file entry size portion of said first entry marker at said first end of said file entry;
    calculating a position of a second entry marker at a second end of the file entry as a function of said first file entry size portion wherein said second entry marker position calculating includes one of incrementing and decrementing said pointer by an amount in accordance with said first entry file size portion;
    determining if the file data at the calculated position is a second entry marker;
    if the file data at the calculated position is a second entry marker, comparing said first entry size portion of said first entry marker to a second file entry size portion of said second entry marker;
    determining if the file data between said first and second entry markers is a valid entry as a function of said file entry size portion comparison; and
    storing in a physical computer readable storage medium an indication as a function of said valid entry determining, whether the file data between said first and second entry markers is a valid entry.

2. The method of claim 1 wherein said determining if the file data between said first and second entry markers is a valid entry includes determining that said file data is a valid entry if the first entry size portion of said first entry marker matches said second file entry size portion of said second entry marker and determining that said file data is an invalid entry if the first entry size portion of said first entry marker does not match said second file entry size portion of said second entry marker.

3. The method of claim 1 wherein said second entry marker determining includes identifying a marker identification portion of said marker.

4. The method of claim 3 wherein said marker identification portion of each said marker is a predetermined code.

5. The method of claim 1 wherein said calculating includes incrementing said pointer as said file is traversed in a first direction from a first end of said file to a second end of said file and wherein said calculating includes decrementing said pointer as said file is traversed in a second direction, opposite that of said first direction.

6. The method of claim 1 further comprising:
    if the file data between said first and second entry markers is determined to be an invalid entry, calculating a position of a third entry marker as a function of said second file entry size portion;
    determining if the file data at the calculated position is a third entry marker;
    if the file data at the calculated position is a third entry marker, comparing said second entry size portion of said second entry marker to a third file entry size portion of said third entry marker; and
    determining if the file data between said second and third entry markers is a valid entry as a function of said comparison of said second and third entry size portions.

7. The method of claim 1 further comprising:
    if the file data between said first and second entry markers is determined to be an invalid entry, finding a third entry marker;
    comparing said second entry size portion of said second entry marker to a third file entry size portion of said third entry marker; and
    determining if the file data between said second and third entry markers is a valid entry as a function of said comparison of said second and third entry size portions.

8. A method for deploying computing instructions, comprising:
    integrating computer-readable code into a system, wherein the system has a computer readable storage medium adapted to maintain a file comprising a plurality of file entries wherein each file entry comprises first and second entry markers and a body of data between said first and second markers wherein each entry marker comprises an identification portion and a file entry size portion which is a function of the size of said data body, and wherein the code in combination with the system is enabled to cause the system to perform:
        addressing a first entry marker at a first end of a file entry using a pointer which points to an address of file data containing at least a portion of said first marker;
        reading a first file entry size portion of a first entry marker at a first end of a file entry;
        calculating a position of a second entry marker at a second end of the file entry as a function of said first file entry size portion wherein said second entry marker position calculating includes one of incrementing and decrementing said pointer by an amount in accordance with said first entry file size portion;

determining if the file data at the calculated position is a second entry marker;

if the file data at the calculated position is a second entry marker, comparing said first entry size portion of said first entry marker to a second file entry size portion of said second entry marker;

determining if the file data between said first and second entry markers is a valid entry as a function of said file entry size portion comparison; and storing in a physical computer readable storage medium an indication as a function of said valid entry determining, whether the file data between said first and second entry markers is a valid entry.

9. The method of claim 8 wherein said determining if the file data between said first and second entry markers is a valid entry includes determining that said file data is a valid entry if the first entry size portion of said first entry marker matches said second file entry size portion of said second entry marker and determining that said file data is an invalid entry if the first entry size portion of said first entry marker does not match said second file entry size portion of said second entry marker.

10. The method of claim 8 wherein said second entry marker determining includes identifying a marker identification portion of said marker.

11. The method of claim 8 wherein said marker identification portion of each said marker is a predetermined code.

12. The method of claim 8 wherein said calculating includes incrementing said pointer as said file is traversed in a first direction from a first end of said file to a second end of said file and wherein said calculating includes decrementing said pointer as said file is traversed in a second direction, opposite that of said first direction.

13. The method of claim 8 wherein the code in combination with the system is further enabled to cause the system to perform:

if the file data between said first and second entry markers is determined to be an invalid entry, calculating a position of a third entry marker as a function of said second file entry size portion;

determining if the file data at the calculated position is a third entry marker;

if the file data at the calculated position is a third entry marker, comparing said second entry size portion of said second entry marker to a third file entry size portion of said third entry marker; and determining if the file data between said second and third entry markers is a valid entry as a function of said comparison of said second and third entry size portions.

14. The method of claim 8 wherein the code in combination with the system is further enabled to cause the system to perform:

if the file data between said first and second entry markers is determined to be an invalid entry, finding a third entry marker;

comparing said second entry size portion of said second entry marker to a third file entry size portion of said third entry marker; and determining if the file data between said second and third entry markers is a valid entry as a function of said comparison of said second and third entry size portions.

\* \* \* \* \*